Patented Oct. 3, 1950

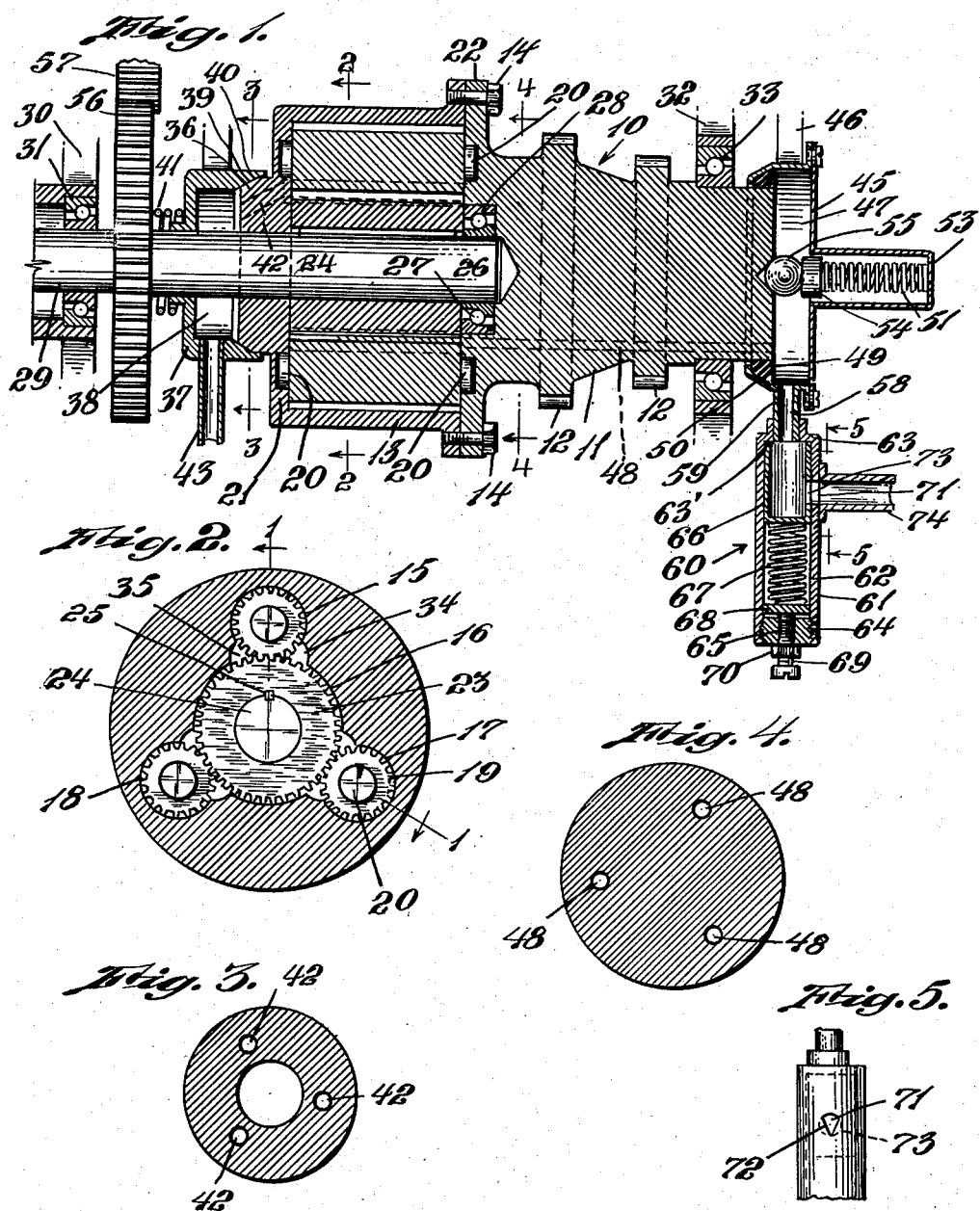

2,524,467

UNITED STATES PATENT OFFICE 2,524,467

GEAR TYPE POWER TRANSMISSION UNIT

Adolf Murat, Woonsocket, R. I.

Application June 12, 1946, Serial No. 676,146

3 Claims. (Cl. 192—61)

This invention relates to a power transmission device, particularly a countershaft for power transmission units of motor vehicles.

The conventional power transmission unit employed in motor vehicles is well known and usually includes a train of gears interposed between the power plant and the main drive shaft of the vehicle. A mechanical clutch is usually employed for connecting and disconnecting the train of gears with the power plant. By shifting certain of the gears the ratio of rotation of the drive shaft with that of the power plant is varied. In the operation of the mechanism, there is a tendency of noisy engagement of gears during shifting, sudden engagement of the clutch, clutch chatter, and stalling of the power plant through sudden overloading by improper coordination of the clutching and gear shifting operation.

An object of the invention is the provision of a power transmission unit of a construction which will eliminate the disadvantages accompanying the use of the conventional type power transmission.

Another object of the invention is the provision of a power transmission unit which will eliminate a sudden engagement of the power plant with the main drive shaft of the vehicle.

Another object of the invention is the provision of a power transmission unit construction which will eliminate clutch chatter.

Another object of the invention is the provision of a power transmission unit construction which will provide for effecting a transfer of power in a smooth, efficient manner.

Another object of the invention is the provision of a power transmission unit construction which will provide for effecting a transfer of power initially in a gradual manner.

Another object of the invention is the provision of a power transmission unit construction which will provide for effecting a transfer of power at predetermined speeds of rotation of the power plant.

Another object of the invention is the provision of a power transmission unit construction which will remain in non-transmitting relationship at predetermined speeds of rotation of the power plant.

With these and other objects in view, the invention consists of certain novel features of construction, as will be more fully described and particularly pointed out in the appended claims.

In the accompanying drawings:

Fig. 1 is a longitudinal sectional view of a fragmental portion of a transmission unit taken along lines 1—1 of Fig. 2;

Fig. 2 is a sectional view taken substantially along lines 2—2 of Fig. 1;

Fig. 3 is a sectional view taken substantially along line 3—3 of Fig. 1;

Fig. 4 is a sectional view taken substantially along line 4—4 of Fig. 1; and

Fig. 5 is a view looking toward line 5—5 of Fig. 1 of a valve control mechanism.

In carrying out the invention, I make the conventional countershaft of a power transmission unit of a motor vehicle in two parts and mount these for relative rotation. Hydraulic means are provided for locking the two parts to rotate as a unit upon a predetermined speed of rotation of the power plant having been attained. The hydraulic means may take any of various forms, but preferably the construction includes a gear pump arrangement, a portion of which is carried by one of the parts and another portion carried by the other part, and by controlling the discharge of fluid on the outlet side of the pump, a gradual pressure of fluid is built up to provide for the gradual locking of the pump gears so that they will rotate as a unit and consequently the countershaft parts to which the gears are attached, thereby effecting a smooth initial starting of the rotation of the driven part of the countershaft.

Referring to the drawings for a more detailed description of the invention, 10 designates generally a countershaft to be employed with the other parts of a conventional transmission unit of a motor vehicle. This countershaft comprises a body portion 11 having gear wheels 12—12 thereon which may be affixed thereto in any suitable manner, that herein shown being cast integral with the portion 11. A casing 13 is secured to the portion 11 by means of bolts 14 and is provided with cavities 15, 16, 17 and 18 (Fig. 2) which provide pump gear compartments. The cavities 15, 17 and 18 are similar to each other and there is rotatably mounted in each a pump gear 19 by means of trunnions 20 extending therefrom and journaled in the wall 21 of the casing 13 and the wall 22 of the portion 11. In the cavity 16 there is mounted a main pump gear wheel 23 which is operably connected to a drive shaft 24 so as to rotate therewith as by means of a spline or key 25. The inner end portion 26 of the shaft 24 is journaled in the portion 11 by means of antifriction bearings 27 secured to the shaft and to the walls of an opening 28 in the portion 11 in a usual well-known manner, such as by frictional engagement. The opposite end 29 of this shaft 24 is mounted in a support 30 by means of antifriction member 31. The portion 11 is mounted in a support 32 by means of antifriction member 33. It will be apparent that the mounting of the countershaft parts is such as to provide for relative rotation between the driven portion 11 and the drive shaft 24.

Each pump gear compartment is provided with an inlet port 34 and an outlet port 35. At the end portion 36 of the casing 13, a hollow member 37 provides an inlet chamber 38 surrounding the shaft 24. This member 37 is provided with an inclined sealing surface 39 and is held against rotation but is axially slidable along the shaft so as to engage a similar surface 40 on the casing 13, providing a seal for preventing the escape of fluid from the chamber 38. These surfaces are maintained in yieldable engagement by means of a compression spring 41. Conduits 42 provide passages for the fluid from chamber 38 to the inlet ports 34. Fluid is supplied to the chamber 38 as by means of a conduit 43 which may extend from a source of supply not shown.

At the opposite end of the countershaft a hollow casing 45 is mounted on a support 46 in a manner to be held against rotation but which will permit of limited axial movement and which provides an outlet chamber 47. Conduits 48 extend from chamber 47 through the portion 11 to the outlet ports 35 to provide passage ways for the fluid from the ports to the chamber 47. In order to prevent the escape of fluid between the walls of the casing 45 and the end portion of the countershaft, a resilient annulus 49 is secured to the end extremity of the portion 11. The outer periphery of this annulus 49 is provided with an inclined sealing surface and is engaged by a similarly inclined sealing surface on the outer wall 50 of the casing 45. The casing 45, as previously stated, is slidably mounted so that these sealing surfaces may be yieldingly held in engagement by a compression spring 51 which has one end abutting against wall 53 of the casing and its other end provided with a button 54 which abuts against a ball 55 resting in a tapered central opening in the portion 11 and tends to move the casing 45 axially in an outwardly direction.

The shaft 24 is provided with a gear wheel 56 which meshes with a gear wheel 57 for receiving power from the power plant of the vehicle through a manual clutch device, not shown, usually provided in conjunction with transmission drives.

It may now be apparent that rotation of the gear 56 through the gear 57 will rotate the pump gear 23 fixed thereto and in turn the gears intermeshing therewith and carry the fluid from the inlet ports to the outlet port and through the conduits 38 outwardly into the chamber 47. The fluid is discharged from the chamber 47 through an opening or passage 58 provided by a tubular member 59 extending from the chamber 47.

In order to control the discharge or escape of fluid from chamber 47, the tubular member is provided with a valve mechanism designated generally 60. This valve mechanism comprises a hollow casing 61 providing a chamber 62 having wall 63 providing a shoulder 63' and closed at the other end by a threaded plug element 64 through which is provided a threaded opening 65. In this chamber there is slidably received a hollow piston 66 open at one end and closed at the other end. The open end of the piston is positioned to face the passage 58 and the wall thereof is in line to engage the shoulder 63'. Interposed between the other end of the piston 66 and the bottom of the chamber 62 is a compression spring 67 which tends to move the piston to abut against the shoulder 63'. The tension of this spring 67 is controlled by means of a disc 63 positioned in the bottom of chamber 62 and against which the spring rests. A screw 69 received in the opening 65 is rotatable to move the disc whereby to compress the spring 67 and the adjustment is preserved by means of a check nut 70.

The wall of the casing 61 is provided with an opening 71 having tapered walls 72 best shown in Fig. 5. The piston 66 is also provided with an opening 73 in the wall thereof which is positioned at a location so as to be in line with the opening 71 and through which fluid will pass in escaping from compartment 47. A conduit 74 may be provided for the passage of fluid from the opening 71 to a supply reservoir, not shown.

The size of the opening 71 is so chosen that at predetermined speeds of rotation of the drive shaft 24 the flow of fluid from the chamber 47 will be such as to permit little if any pressure to be built up into this chamber, but upon accelerating of rotation of the shaft 24 the intake of fluid in chamber 47 will be greater than that which is vented through the openings 71, 73. Pressure will be built up and act against the bottom wall of the piston 66 and cause the same to move against the action of the spring and reduce the size of the opening 71, thereby providing for an increasing pressure to move the piston 66 sufficiently so as to close the opening 71 and thereby prevent the escape of fluid from compartment 47. When the pressure of the fluid as carried by the gears from the inlet to the outlet ports is such as to act in opposition to the path of rotation of the pump gears, the same will be held against movement and consequently the portion 11 and casing 13 fixed thereto will rotate with the drive shaft 24. Such gears which may be in mesh with the gears 12 will be rotated thereby and power will be transmitted from the power plant through this counter shaft to the main drive shaft of the motor vehicle. It will be apparent that the size of the openings 71 and the form thereof may be so chosen as to provide for a gradual starting of rotation of the countershaft and thereby prevent any sudden engagement of the clutch or overloading of the power plant through improper coordination of the clutching and shifting operations.

I claim:

1. A countershaft for a power transmission unit comprising a body portion mounted for rotary movement and having gear teeth on the outer side thereof and a plurality of cavities therein providing pump gear compartments and containing fluid therein, inlet and outlet ports for each compartment, a stationary inlet chamber at one end portion of said body, a stationary outlet chamber at the other end portion of said body, conduits extending from said ports to said chambers, said outlet chamber having an opening therein for the escape of fluid therefrom, a drive shaft extending through said inlet chamber and journalled in said body portion, intermeshing pump gears in said compartments, one of said gears being operatively connected to and rotated by said drive shaft and the other gears rotatably mounted on said body portion, and means operable by the pressure of the fluid for controlling the flow of the fluid through said opening whereby the pressure of the fluid as it is carried by said gears from the inlet to the outlet ports will act in opposition to the path of rotation of said gears, whereby said gears will be held against or controlled in movement to cause the body portion to rotate with said drive shaft, resilient means encircling said drive shaft and acting against the wall of said inlet chamber tending to move the walls of said chamber into engagement with said body, and means for sealing said chambers against the escape of fluid between the adjacent surfaces of said chambers and said body portion.

2. A countershaft for a power transmission unit comprising a body portion mounted for rotary movement and having a plurality of cavities therein providing pump gear compartments and containing fluid therein, inlet and outlet ports for each compartment, a stationary inlet chamber at one end of said body portion, a stationary outlet chamber at the other end of said body portion, conduits extending from said ports to said chambers, said outlet chamber having an opening therein for the escape of fluid therefrom, a drive shaft journalled in said body portion, intermeshing pump gears in said compartments, one of said gears being operatively connected to and rotated by said drive shaft and the other gears rotatably mounted to said body portion and a valve operable by the pressure of the fluid for controlling the flow of the fluid through said opening, whereby the pressure of the fluid as it is carried by said gears from the inlet to the outlet ports will act in opposition to the path of rotation of said gears, whereby said gears will be held against or controlled in movement to cause the body portion to rotate with said drive shaft, said valve comprising a hollow casing connected to said outlet chamber and having an opening for the passage of fluid therethrough and a hollow spring pressed plunger in said casing having an opening therein to align with the opening in said casing, said plunger being movable by the pressure of the fluid thereon to close said opening in said casing to control the flow of fluid therethrough.

3. A countershaft for a power transmission unit comprising a body portion mounted for rotary movement and having gear teeth on the outer side thereof and a plurality of cavities therein providing pump gear compartments and containing fluid therein, inlet and outlet ports for each compartment, a stationary inlet chamber at one end of said body portion, a stationary outlet chamber at the other end of said body portion, resilient means urging the walls of said chambers into engagement with said body, conduits extending from said ports to said chambers, said outlet chamber having an opening therein for the escape of fluid therefrom, a drive shaft journalled in said body portion, intermeshing pump gears in said compartments, one of said gears being operatively connected to and rotated by said drive shaft, and the other gears rotatably mounted on said body portion, and means operable by the pressure of the fluid for controlling the flow of the fluid through said opening, whereby the pressure of the fluid as it is carried by said gears from the inlet to the outlet ports will act in opposition to the path of rotation of said gears, whereby said gears will be held against or controlled in movement to cause the body portion to rotate with said drive shaft, and means for sealing said chambers against the escape of fluid between the adjacent surfaces of said chambers and said body.

ADOLF MURAT.

REFERENCES CITED

The following references are of record in the file of this patent:

UNITED STATES PATENTS

| Number | Name | Date |
|---|---|---|
| 2,145,894 | Rusch | Feb. 7, 1939 |
| 2,329,594 | Corrigan | Sept. 14, 1943 |

FOREIGN PATENTS

| Number | Country | Date |
|---|---|---|
| 466,835 | Great Britain | June 7, 1937 |